US012699573B2

(12) United States Patent
Singh

(10) Patent No.: US 12,699,573 B2
(45) Date of Patent: Aug. 4, 2026

(54) INTELLIGENT APPARATUS LEVERAGING PHOTONIC QUANTUM GENERATIVE ARTIFICIAL INTELLIGENCE (AI) TO GENERATE CROWDSENSING DEVICE CONFIGURATIONS

(71) Applicant: Bank of America Corporation, Charlotte, NC (US)

(72) Inventor: Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 184 days.

(21) Appl. No.: 18/635,106

(22) Filed: Apr. 15, 2024

(65) Prior Publication Data

US 2025/0321749 A1 Oct. 16, 2025

(51) Int. Cl.
*G06F 9/4401* (2018.01)

(52) U.S. Cl.
CPC .................................. *G06F 9/4411* (2013.01)

(58) Field of Classification Search
CPC ...................................................... G06F 9/4411
See application file for complete search history.

(56) References Cited

U.S. PATENT DOCUMENTS

| | | | |
|---|---|---|---|
| 10,166,991 B1 | 1/2019 | Bai et al. | |
| 10,185,973 B2 * | 1/2019 | Priness | ................... H04W 4/02 |
| 10,939,262 B2 | 3/2021 | Mosenia et al. | |

| | | | |
|---|---|---|---|
| 10,989,786 B2 | 4/2021 | Wang et al. | |
| 11,029,300 B2 | 6/2021 | Azpiroz et al. | |
| 11,205,110 B2 * | 12/2021 | Willson | ................ G06F 40/216 |
| 11,621,973 B2 * | 4/2023 | Mylrea | .................. G06F 21/602 |
| | | | 726/25 |
| 11,879,744 B2 | 1/2024 | Shin et al. | |
| 11,928,708 B1 * | 3/2024 | Janos | ................. G06Q 30/0246 |
| 2014/0214832 A1 | 7/2014 | Nandakumar et al. | |
| 2015/0285639 A1 | 10/2015 | Basalamah et al. | |
| 2016/0124976 A1 * | 5/2016 | Bai | ................... G08G 1/096741 |
| | | | 707/748 |
| 2016/0196268 A1 | 7/2016 | Borger et al. | |
| 2017/0146362 A1 | 5/2017 | Bai et al. | |
| 2017/0349148 A1 | 12/2017 | Bojanowski et al. | |
| 2018/0181879 A1 | 6/2018 | Wang et al. | |
| 2018/0268244 A1 * | 9/2018 | Moazzami | ........... G06V 20/176 |
| 2019/0049262 A1 | 2/2019 | Grimm et al. | |
| 2019/0274018 A1 | 9/2019 | Mosenia et al. | |

(Continued)

*Primary Examiner* — Aurel Prifti
(74) *Attorney, Agent, or Firm* — Banner & Witcoff, Ltd.

(57) ABSTRACT

A computing platform may receive, from a user device, a prompt configured for input into a generative AI model. The computing platform may input the prompt into the generative AI model to identify a schemas for use in providing a response to the prompt, where each schema may be a configuration of device clusters, each device may be an IoT enabled device configured to provide crowdsensed information, and the generative AI model may score the schemas, and select, based on identifying that a first schema has a highest score, the first schema. The computing platform may collect, from devices comprising the first schema, crowdsensed information. The computing platform may generate, based on the crowdsensed information, a response to the prompt. The computing platform may send, to the user device, the response to the prompt and may cause the user device to display the response to the prompt.

20 Claims, 8 Drawing Sheets

(56)　　　　　References Cited

U.S. PATENT DOCUMENTS

| | | | |
|---|---|---|---|
| 2019/0288853 A1* | 9/2019 | Gray | H04L 9/3247 |
| 2019/0383783 A1 | 12/2019 | Azpiroz et al. | |
| 2020/0023797 A1 | 1/2020 | Volos et al. | |
| 2020/0166941 A1 | 5/2020 | Yu et al. | |
| 2020/0307950 A1 | 10/2020 | Sudi et al. | |
| 2021/0014654 A1 | 1/2021 | Gupta et al. | |
| 2021/0072039 A1 | 3/2021 | Shin et al. | |
| 2021/0089587 A1* | 3/2021 | Gupta | G06F 16/90332 |
| 2021/0117300 A1* | 4/2021 | Santhar | G06F 11/3082 |
| 2022/0014589 A1* | 1/2022 | Padiyar | H04L 67/12 |
| 2022/0058745 A1* | 2/2022 | Crabtree | G06Q 40/06 |
| 2022/0171773 A1* | 6/2022 | Mac an tSaoir | G06F 16/90332 |
| 2023/0153779 A1* | 5/2023 | Bharti | G06F 40/40 |
| | | | 705/39 |
| 2023/0315722 A1* | 10/2023 | Saxe | G06F 16/3322 |
| | | | 726/1 |
| 2023/0334064 A1* | 10/2023 | Narumi | H04L 9/50 |
| 2023/0417861 A1 | 12/2023 | Edge et al. | |
| 2023/0421993 A1 | 12/2023 | Edge et al. | |
| 2024/0265472 A1* | 8/2024 | Jain | G06Q 10/40 |
| 2024/0272951 A1* | 8/2024 | Wang | G06F 9/5027 |
| 2024/0419920 A1* | 12/2024 | Mehrotra | H04W 24/02 |
| 2025/0053928 A1* | 2/2025 | Colter | G06Q 10/1053 |

* cited by examiner

100

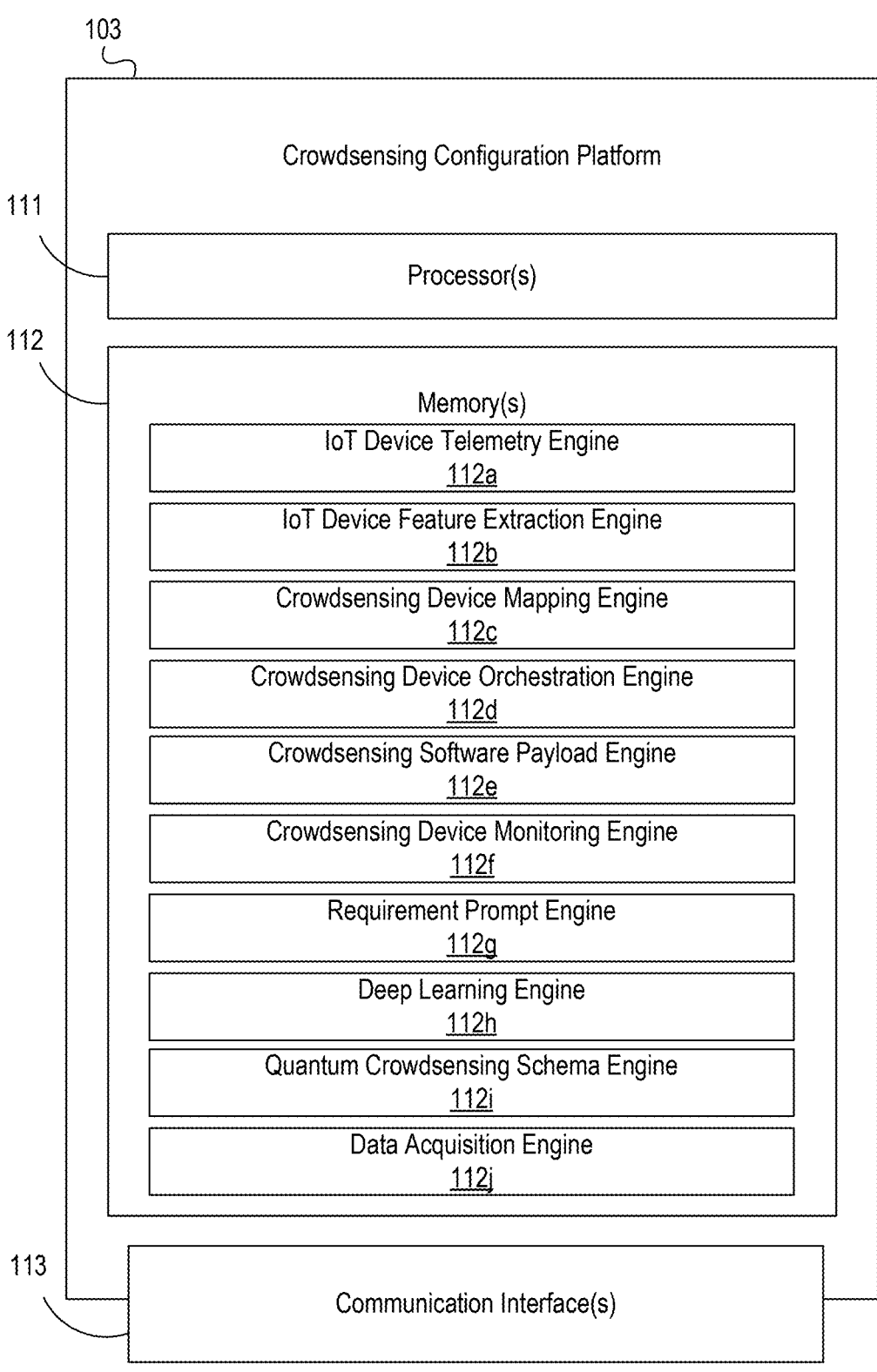

103

Crowdsensing Configuration Platform

111

Processor(s)

112

Memory(s)

IoT Device Telemetry Engine
112a

IoT Device Feature Extraction Engine
112b

Crowdsensing Device Mapping Engine
112c

Crowdsensing Device Orchestration Engine
112d

Crowdsensing Software Payload Engine
112e

Crowdsensing Device Monitoring Engine
112f

Requirement Prompt Engine
112g

Deep Learning Engine
112h

Quantum Crowdsensing Schema Engine
112i

Data Acquisition Engine
112j

113

Communication Interface(s)

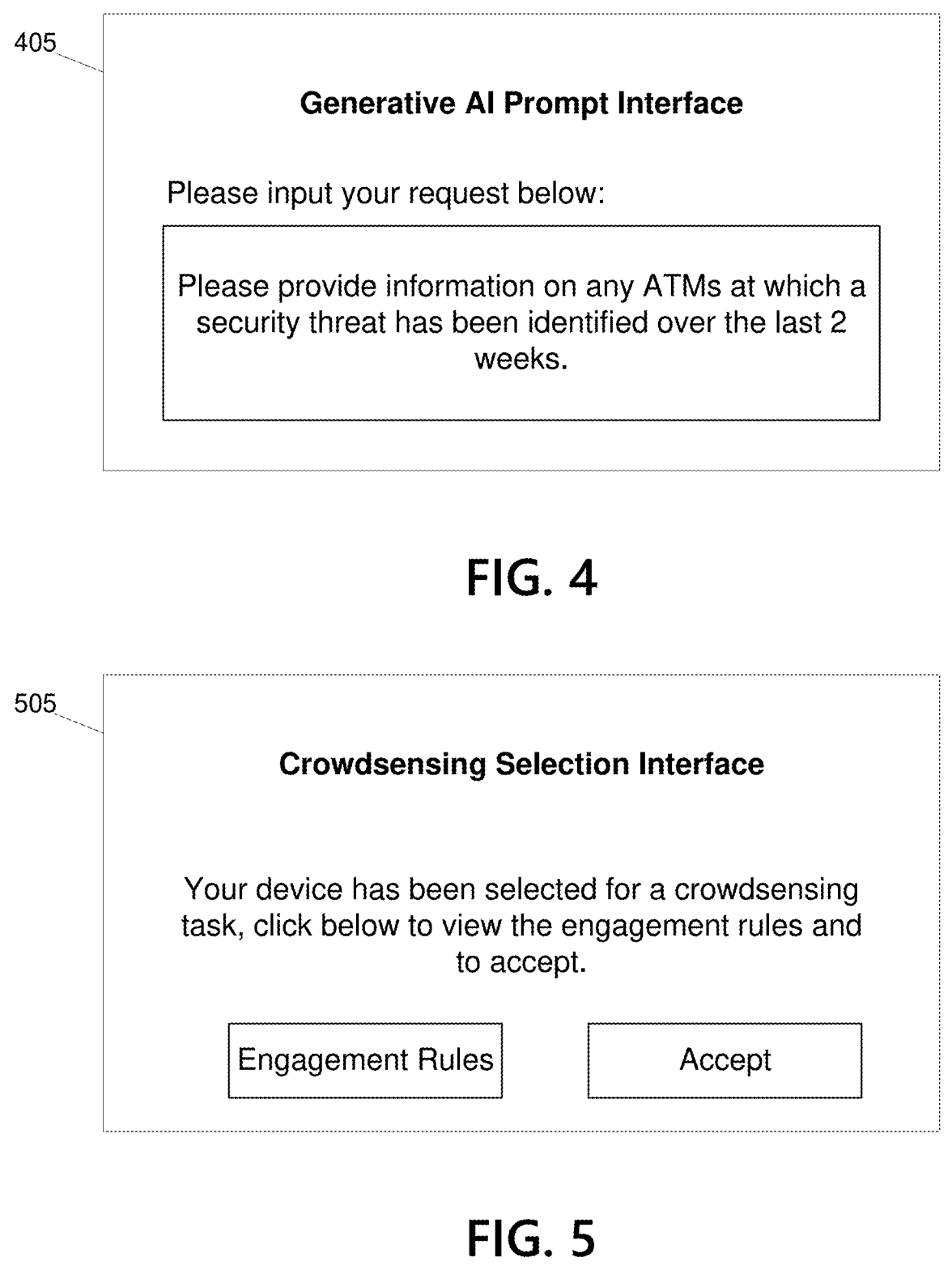

Generative AI Prompt Interface

Please input your request below:

Please provide information on any ATMs at which a security threat has been identified over the last 2 weeks.

Crowdsensing Selection Interface

Your device has been selected for a crowdsensing task, click below to view the engagement rules and to accept.

| Engagement Rules | Accept |

FIG. 5

INTELLIGENT APPARATUS LEVERAGING PHOTONIC QUANTUM GENERATIVE ARTIFICIAL INTELLIGENCE (AI) TO GENERATE CROWDSENSING DEVICE CONFIGURATIONS

BACKGROUND

Crowdsensing, which may be referred to as mobile/ Internet of things (IoT) crowdsensing, is a technique where a large group of individuals having mobile/IoT devices capable of sensing and computing collectively share information and extract information to measure, map, analyze, estimate, or infer any processes of common interest. Based on a type of involvement from the users, mobile/IoT crowdsensing can be classified into two types—1) participatory crowdsensing, where the users voluntarily participate in contributing information, and 2) opportunistic crowdsensing, where the data is sensed, collected, and shared automatically (e.g., once permission has been obtained) without user intervention. In either event, it may be difficult to identify which devices should be engaged for crowdsensing activities in a given scenario.

SUMMARY

Aspects of the disclosure provide effective, efficient, scalable, and convenient technical solutions that address and overcome the technical problems associated with developing and implementing computer hardware and software that leverages photonic quantum generative AI to generate crowdsensing device configurations. In accordance with one or more embodiments of the disclosure, a computing platform comprising at least one processor, a communication interface, and memory storing computer-readable instructions may receive, from a user device, a prompt configured for input into a generative artificial intelligence (AI) model. The computing platform may input the prompt into the generative AI model to identify a plurality of schemas for use in providing a response to the prompt, where each schema may be a configuration of device clusters, each device may be an internet of things (IoT) enabled device configured to provide crowdsensed information, and the generative AI model may score the plurality of schemas. The computing platform may select, based on identifying that a first schema of the plurality of schemas has a highest score, the first schema. The computing platform may collect, from a first plurality of devices comprising the first schema, crowdsensed information. The computing platform may generate, based on the crowdsensed information, a response to the prompt and one or more corrective actions. The computing platform may send, to the user device, the response to the prompt and one or more commands directing the user device to display the response to the prompt, which may cause the user device to display the response to the prompt. The computing platform may execute the one or more corrective actions, which may cause an issue, indicated in the response and detected based on the crowdsensed information, to be automatically remediated.

In one or more instances, the prompt may include metadata such as a crowdsensing task description, business rules, security rules, data aggregation rules, data acquisition rules, crowdsensing task temporal and spatial rules, crowdsensing task software payload source information, IoT internet protocol (IP) addresses, or network type information. In one or more instances, the computing platform may generate, based on the metadata, one or more smart contracts, each defining a device cluster within the configuration of device clusters.

In one or more examples, generating the first schema may include identifying, using the one or more smart contracts, whether each IoT enable device may be added to a corresponding device cluster. In one or more examples, the computing platform may detect a schema update event. The computing platform may update, based on detection of the schema update event, the one or more smart contracts. The computing platform may update, using the updated one or more smart contracts, the first schema.

In one or more instances, detecting the schema update event may include detecting one or more of: more than a threshold number of the devices no longer satisfy the corresponding smart contract, more than a threshold amount of time has passed since the first schema was selected, or latency corresponding to the first schema exceeds a predetermined threshold. In one or more instances, a first device cluster of the configuration of device clusters may correspond to a first device type and a second device cluster of the configuration of device clusters may correspond to a second device type.

In one or more examples, scoring the plurality of schemas may include scoring the plurality of schemas, based on one or more of: latency in request processing, processing power, or computational complexity. In one or more examples, collecting the crowdsensed information may include collecting the crowdsensed information after receiving approval from the corresponding user. In one or more examples, the one or more corrective actions may include one or more of: deploying a software update, dispatching a technician, or taking a system offline.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 1A-1B depict an illustrative computing environment configured to leverage photonic quantum generative AI to generate crowdsensing device configurations in accordance with one or more example embodiments;

FIGS. 4 and 5 depict illustrative graphical user interfaces associated with leveraging photonic quantum generative AI to generate crowdsensing device configurations in accordance with one or more example embodiments.

DETAILED DESCRIPTION

Figure 1A:
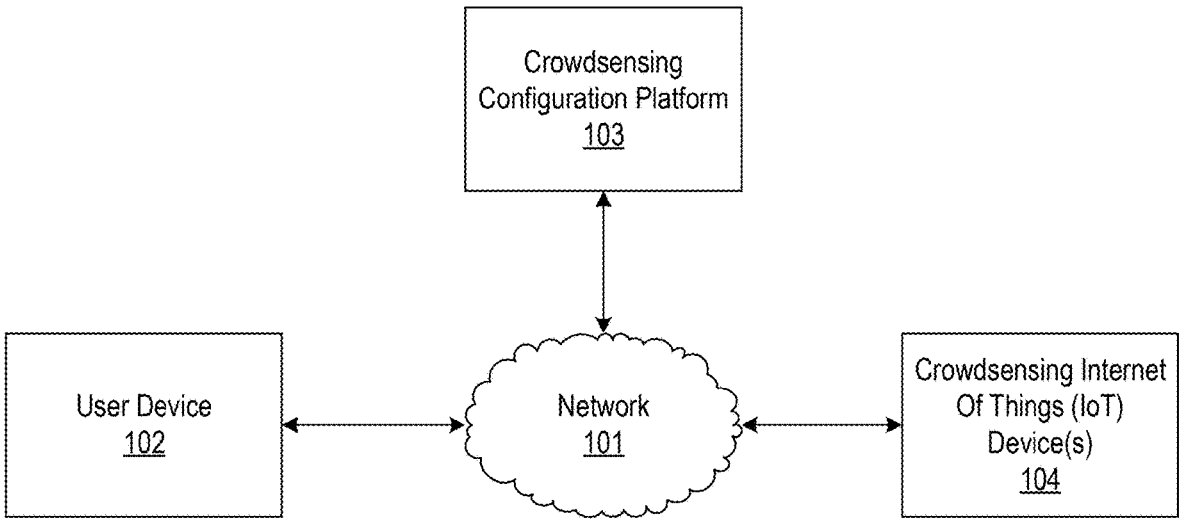

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to leveraging photonic quantum generative AI to generate crowdsensing device configurations.

Crowdsensing, sometimes referred to as mobile/IoT crowdsensing, is a technique where a large group of individuals having mobile/IoT devises capable of sensing and computing collectively share data and extract information to measure, map, analyze, estimate, or infer any processes of common interest. Based on the type of involvement from the users, mobile/IoT crowdsensing may be classified into two types: participatory crowdsensing, where the users voluntarily participate in contributing information, and opportunistic crowdsensing, where the data may be sensed, collected, and shared automatically without user intervention. In both of the above cases, there may be a need to develop an intelligent technical procedure that may automatically define clusters/configurations/swarms of target mobile/IoT devices that need to be engaged for crowdsensing activities.

Accordingly, described herein is an intelligent technical procedure and apparatus to generate optimized crowdsensing device configurations, leveraging photonic quantum generative AI technology. The method may generate a crowdsensing device configuration schema based on business user requirements through a prompt AI engine, where user requirement prompts may be analyzed, and used to derive crowdsensing device configurations. Derived crowdsensing device configurations may be selected, and blockchain smart contracts may be leveraged to orchestrate data extraction and acquisition rules on a selected crowdsensing device configuration.

This method may enable a communication protocol between more than one crowdsensing device configuration clustered/grouped to derive inferences. User requirements may be mapped to IoT crowdsensing device feature attributes, and used to dynamically create inter and intra mesh networks of crowdsensing IoT devices controlled by a smart contract. Smart control may define business, security, and technical data acquisition and aggregation rules/protocols to establish automatic engagement with IoT devices.

Once a target crowdsensing IoT device is selected, it may deliver an engagement message payload, based on a user acceptance method that deploys a software payload linked to a crowdsourcing task on an IoT device.

The crowdsensing device configuration/schema may be monitored in real time to identify any anomalies with respect to user requirements and to disengage or isolate sections of an IoT device not complying with predefined smart contract rules. The method may establish secure crowdsensing IoT device engagement, data acquisition, and aggregation using homomorphic encryption to prevent privacy issues.

Components of the system may include an IoT device telemetry engine, IoT device feature extraction engine, crowdsensing device mapping engine, crowdsensing software payload engine, crowdsensing device monitoring engine, requirement prompt engine, quantum deep learning engine, crowdsensing schema engine, data acquisition engine and/or other engines, modules, or devices.

These and other features are described in further detail below.

FIGS. 1A-1B depict an illustrative computing environment that leverages photonic quantum generative artificial intelligence (AI) to generate crowdsensing device configurations in accordance with one or more example embodiments. Referring to FIG. 1A, computing environment 100 may include one or more computer systems. For example, computing environment 100 may include user device 102, crowdsensing configuration platform 103, and crowdsensing internet of things (IoT) device(s) 104.

User device 102 may be and/or otherwise include one or more devices such as a laptop computer, desktop computer, mobile device, tablet, smartphone, and/or other device that may be used by an individual to submit a prompt to a generative AI model. In some instances, the user device 102 may be configured to generate the prompt based on user input, automatically generate the prompt, and/or otherwise generate the prompt. Although a single user device 102 is shown, any number of such devices may be deployed in the systems/methods described below without departing from the scope of the disclosure.

As described further below, crowdsensing configuration platform 103 may be a computer system that includes one or more computing devices (e.g., servers, server blades, or the like) and/or other computer components (e.g., processors, memories, communication interfaces) that may be used to identify, select, and/or otherwise manage clusters of IoT devices configured to provide crowdsensing information. In these instances, the crowdsensing configuration platform 103 may be configured to train, host, and/or otherwise maintain an artificial intelligence engine that may be used to identify, based on metadata indicated in a generative AI prompt, an optimal schema of crowdsensing IoT devices 104 from which crowdsensing information may be obtained to provide a response to the generative AI prompt and/or initiate one or more corrective actions.

Crowdsensing internet of things (IoT) devices 104 may be and/or otherwise include one or more IoT enabled devices such as a laptop computer, desktop computer, mobile device, tablet, smartphone, wearable device, virtual reality device (e.g., a headset or other device), an augmented reality device (e.g., glasses or other device), biometric data collection device, video camera, microphone, kitchen appliance (e.g., stove, refrigerator, microwave oven, dishwasher, or the like), vending machine, vehicle, utility meter (e.g., electricity, water, gas or the like), and/or other device that may be used to collect crowdsensing information. Any number of such crowdsensing IoT device(s) 104 may be deployed in the systems/methods described below without departing from the scope of the disclosure.

Computing environment 100 also may include one or more networks, which may interconnect user device 102, crowdsensing configuration platform 103, and/or crowdsensing IoT device(s) 104. For example, computing environment 100 may include a network 101 (which may interconnect, e.g., user device 102, crowdsensing configuration platform 103, and/or crowdsensing IoT device(s) 104).

In one or more arrangements, user device 102, crowdsensing configuration platform 103, and/or crowdsensing IoT device(s) 104 may be any type of computing device capable of sending and/or receiving requests and processing the requests accordingly. For example, user device 102, crowdsensing configuration platform 103, crowdsensing IoT device(s) 104, and/or the other systems included in computing environment 100 may, in some instances, be and/or include server computers, desktop computers, laptop computers, enhanced reality devices, tablet computers, smart phones, cameras, microphones, biometric devices, and/or other IoT enabled devices that may include one or more processors, memories, communication interfaces, storage devices, and/or other components. As noted above, and as illustrated in greater detail below, any and/or all of user device 102, crowdsensing configuration platform 103, and/or crowdsensing IoT device(s) 104 may, in some instances, be special-purpose computing devices configured to perform specific functions.

Referring to FIG. 1B, crowdsensing configuration platform 103 may include one or more processors 111, memory 112, and communication interface 113. A data bus may interconnect processor 111, memory 112, and communication interface 113. Communication interface 113 may be a network interface configured to support communication between crowdsensing configuration platform 103 and one or more networks (e.g., network 101, or the like). Memory 112 may include one or more program modules having instructions that when executed by processor 111 cause crowdsensing configuration platform 103 to perform one or more functions described herein and/or one or more databases that may store and/or otherwise maintain information which may be used by such program modules and/or processor 111. In some instances, the one or more program modules and/or databases may be stored by and/or maintained in different memory units of crowdsensing configuration platform 103 and/or by different computing devices that may form and/or otherwise make up crowdsensing configuration platform 103. For example, memory 112 may have, host, store, and/or include IoT device telemetry engine 112a, IoT device feature extraction engine 112b, crowdsensing device mapping engine 112c, crowdsensing device orchestration engine 112d, crowdsensing software payload engine 112e, crowdsensing device monitoring engine 112f, requirement prompt engine 112g, deep learning engine 112h, quantum crowdsensing schema engine 112i, data acquisition engine 112j.

IoT device telemetry engine 112a may continuously monitor the properties of the crowdsensing IoT devices 104. IoT device feature extraction engine 112b may extract features of the crowdsensing IoT devices 104 in response to receipt of a user prompt defining one or more requirements/features to be collected by the crowdsensing IoT devices 104. Crowdsensing device mapping engine 112c may link the requirements of the prompt to the corresponding features of the crowdsensing IoT devices 104. Crowdsensing device orchestration engine 112d may manage one or more smart contracts that control access to one or more clusters of the crowdsensing IoT devices 104. Crowdsensing software payload engine 112e may install any necessary software packages on the crowdsensing IoT devices 104. Crowdsensing device monitoring engine 112f may monitor the crowdsensing IoT devices 104. Data acquisition engine 112j may facilitate transport of crowdsensing data between the crowdsensing device monitoring engine 112f and any downstream analysis systems (e.g., payment systems or the like). Requirement prompt engine 112g may deploy rules to prompt for features, requirements, and/or other information for which a solution and/or other analysis may be performed based on the crowdsensing information. Deep learning engine 112h and quantum crowdsensing schema engine 112i may be synchronized and together may identify optimal configuration for use in responding to a received prompt.

Figure 2A:
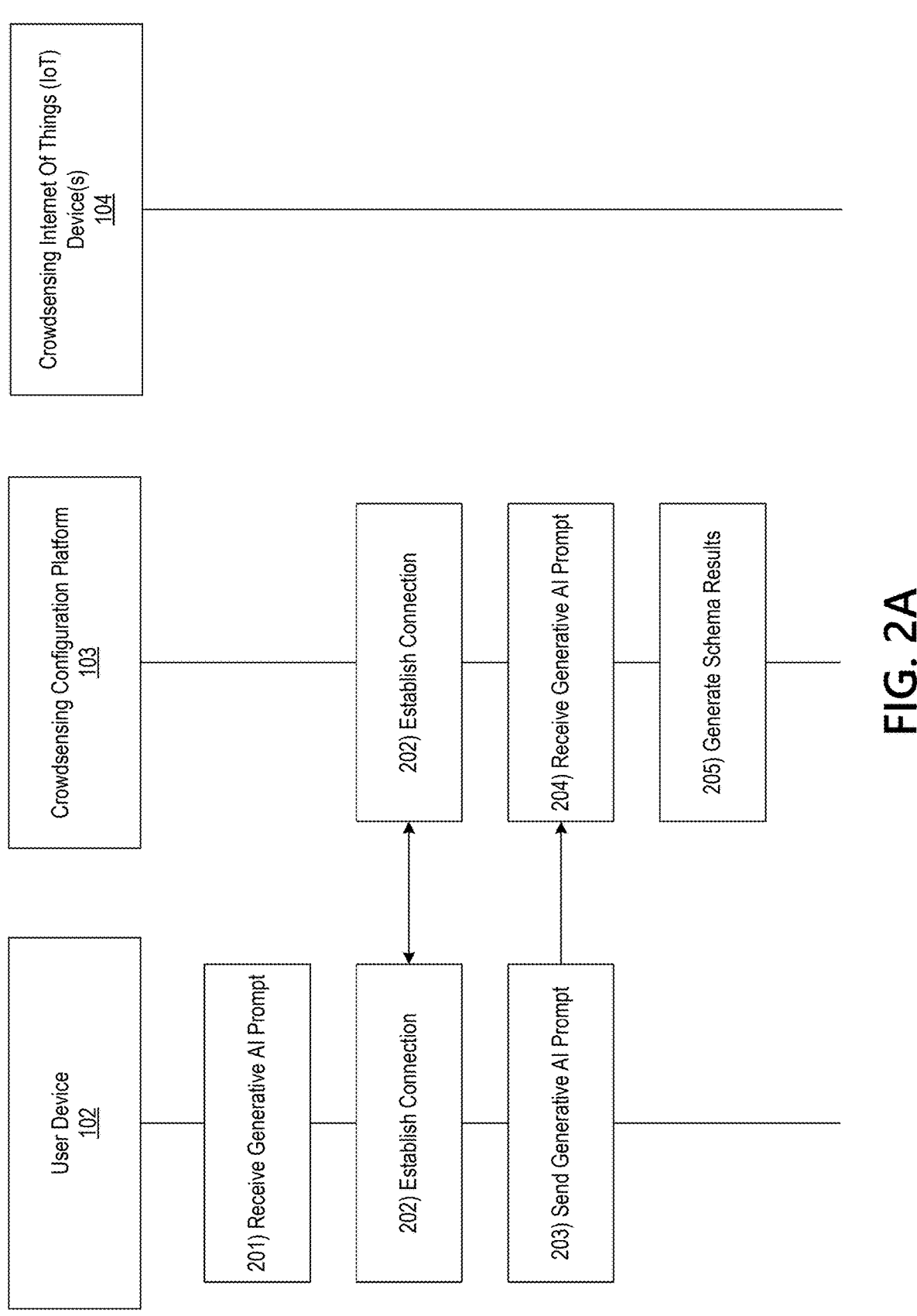
FIGS. 2A-2D depict an illustrative event sequence for leveraging photonic quantum generative AI to generate crowdsensing device configurations in accordance with one or more example embodiments.

FIGS. 2A-2D depict an illustrative event sequence for leveraging photonic quantum generative AI to generate crowdsensing device configurations in accordance with one or more example embodiments. Referring to FIG. 2A, at step 201, the user device 102 may receive a generative AI prompt. In some instances, the user device 102 may generate the prompt based on user input received at the user device 102 (e.g., via an interface similar to graphical user interface 405, which is illustrated in FIG. 4). Additionally or alternatively, the user device 102 may automatically generate the prompt. For example, the user device 102 may generate a prompt requesting detected anomalies (e.g., instances of fraud, machine conditions, or the like), and/or other information. In some instances, the prompt may include metadata such as a crowdsensing task description, business rules, security rules, data aggregation rules, data acquisition rules, crowdsensing task temporal and spatial rules, crowdsensing task software payload sources, IoT IP addresses, network types, and/or other information.

At step 202, the user device 102 may establish a connection with crowdsensing configuration platform 103. For example, the user device 102 may establish a first wireless data connection with the crowdsensing configuration platform 103 to link the user device 102 to the crowdsensing configuration platform 103 (e.g., in preparation for sending prompts and the corresponding responses). In some instances, the user device 102 may identify whether a connection is already established with the crowdsensing configuration platform 103. If a connection is already established with the crowdsensing configuration platform 103, the user device 102 might not re-establish the connection. Otherwise, if a connection is not yet established with the crowdsensing configuration platform 103, the user device 102 may establish the first wireless data connection as described herein.

At step 203, the user device 102 may send the generative AI prompt to the crowdsensing configuration platform 103. For example, the user device 102 may send the generative AI prompt to the crowdsensing configuration platform 103 via the communication interface and while the first wireless data connection is established.

At step 204, the crowdsensing configuration platform 103 may receive the prompt, sent at step 203. For example, the crowdsensing configuration platform 103 may receive the prompt while the first wireless data connection is established. In some instances, the crowdsensing configuration platform 103 may identify that more information is needed to provide a response, and may request additional information from the user device 102 accordingly. In some instances, once received, the metadata of the prompt may be protected through homomorphic encryption. Accordingly, in some instances, the analysis described below may be performed using encrypted information (which may, e.g., provide enhanced security).

At step 205, the crowdsensing configuration platform 103 may generate schema results. For example, the crowdsensing configuration platform 103 may input the metadata of the generative AI prompt (received at step 204) into a deep learning engine to produce one or more cluster configurations, each including one or more crowdsensing IoT devices 104. For example, the crowdsensing configuration platform 103 may have previously performed initial training for the deep learning engine by providing a dataset that includes various request metadata and smart contracts used to define clusters in the corresponding scenarios. In doing so, the crowdsensing configuration platform 103 may have trained the deep learning engine to output one or more cluster configurations (each comprising a schema) and the smart contracts that may be used to associate crowdsensing IoT devices with the clusters accordingly. For example, the smart contracts may define device parameters and/or other requirements needed by devices to be added to the corresponding cluster. In some instances, the smart contracts may also indicate whether edge processing should be used for a given cluster, or the like. Accordingly, based on the context associated with a given prompt, the deep learning engine may be able to identify different configurations of devices that may be able to provide crowdsensed information with which a response may be generated.

Once the deep learning engine is trained, the crowdsensing configuration platform 103 may use the deep learning engine to produce different schemas (e.g., each having device clusters, defined by different smart contracts). For example, the crowdsensing configuration platform 103 may produce a first schema including a first plurality of device clusters, each defined by first smart contracts, and may also produce a second schema, including a second plurality of device clusters, each defined by second smart contracts. In some instances, each cluster may correspond to devices of a particular type (e.g., a first cluster corresponding to mobile devices and a second cluster corresponding to wearable devices, or the like), or devices of multiple different types. In some instances, these schemas may involve the use of existing clusters (e.g., which may already be configured to collect a particular type of IoT information), and/or may cause new clusters to be generated (e.g., where an existing cluster is not yet generated to collect a particular type of IoT information, or the like). In some instances, the crowdsensing configuration platform 103 may use photonic quantum processing to train, maintain, and/or otherwise apply the deep learning engine, which may, e.g., enable more efficient and accurate analysis.

The crowdsensing configuration platform 103 may test performance of these generated schemas (e.g., in terms of latency, processing power consumed, computational resources required, and/or otherwise). Based on these tests, the crowdsensing configuration platform 103 may score each schema (e.g., on a scale of 0-100, with 0 being the worst and 100 being the best, or the like). In some instance, the crowdsensing configuration platform 103 may rank the schemas based on their scores, e.g., from lowest score to highest score, or the like.

Figure 2B:

Referring to FIG. 2B, at step 206, the crowdsensing configuration platform 103 may select and implement one of the schemas produced at step 205. For example, the crowdsensing configuration platform 103 may select the highest ranked schema based on its corresponding score. In implementing the schema, the crowdsensing configuration platform 103 may identify crowdsensing IoT devices associated with the schema, from which crowdsensing information may be obtained.

At step 207, the crowdsensing configuration platform 103 may establish a connection with the crowdsensing IoT devices 104 (e.g., one or more of the crowdsensing IoT devices 104, which may, in some instances, be a subset of the crowdsensing IoT devices 104, associated with the schema). For example, the crowdsensing configuration platform 103 may establish a second wireless data connection with the crowdsensing IoT devices 104 to link the crowdsensing configuration platform 103 to the crowdsensing IoT devices 104 (e.g., in preparation for requesting, sending, and/or otherwise exchanging IoT information). In some instances, the crowdsensing configuration platform 103 may identify whether a connection is already established with the crowdsensing IoT devices 104. If a connection is not yet established with the crowdsensing IoT devices 104, the crowdsensing configuration platform 103 may establish the second wireless data connection as described herein. Otherwise, if a connection is already established with the crowdsensing IoT devices 104, the crowdsensing configuration platform 103 might not re-establish the connection.

At step 208, the crowdsensing IoT devices 104 may collect IoT information. In some instances, the crowdsensing IoT devices 104 may present a graphical user interface requesting permission to collect IoT information. For example, the crowdsensing IoT devices 104 may present a graphical user interface similar to graphical user interface 505, which is illustrated in FIG. 5. In these instances, the corresponding user may be able to access engagement rules associated with the IoT information collection, and/or accept/reject the collection accordingly. In other instances, the crowdsensing IoT devices 104 may automatically collect the IoT information without prompting for additional permission. In some instances, in collecting the IoT information, the crowdsensing IoT devices 104 may collect video footage, still images, audio information, and/or other sensor information.

At step 209, the crowdsensing IoT devices 104 may send the IoT information collected at step 208 to the crowdsensing configuration platform 103. For example, the crowdsensing IoT devices 104 may send the IoT information to the crowdsensing configuration platform while the second wireless data connection is established.

At step 210, the crowdsensing configuration platform 103 may receive the IoT information sent at step 209. For example, the crowdsensing configuration platform 103 may receive the IoT information via the communication interface 113 and while the second wireless data connection is established.

Figure 2C:
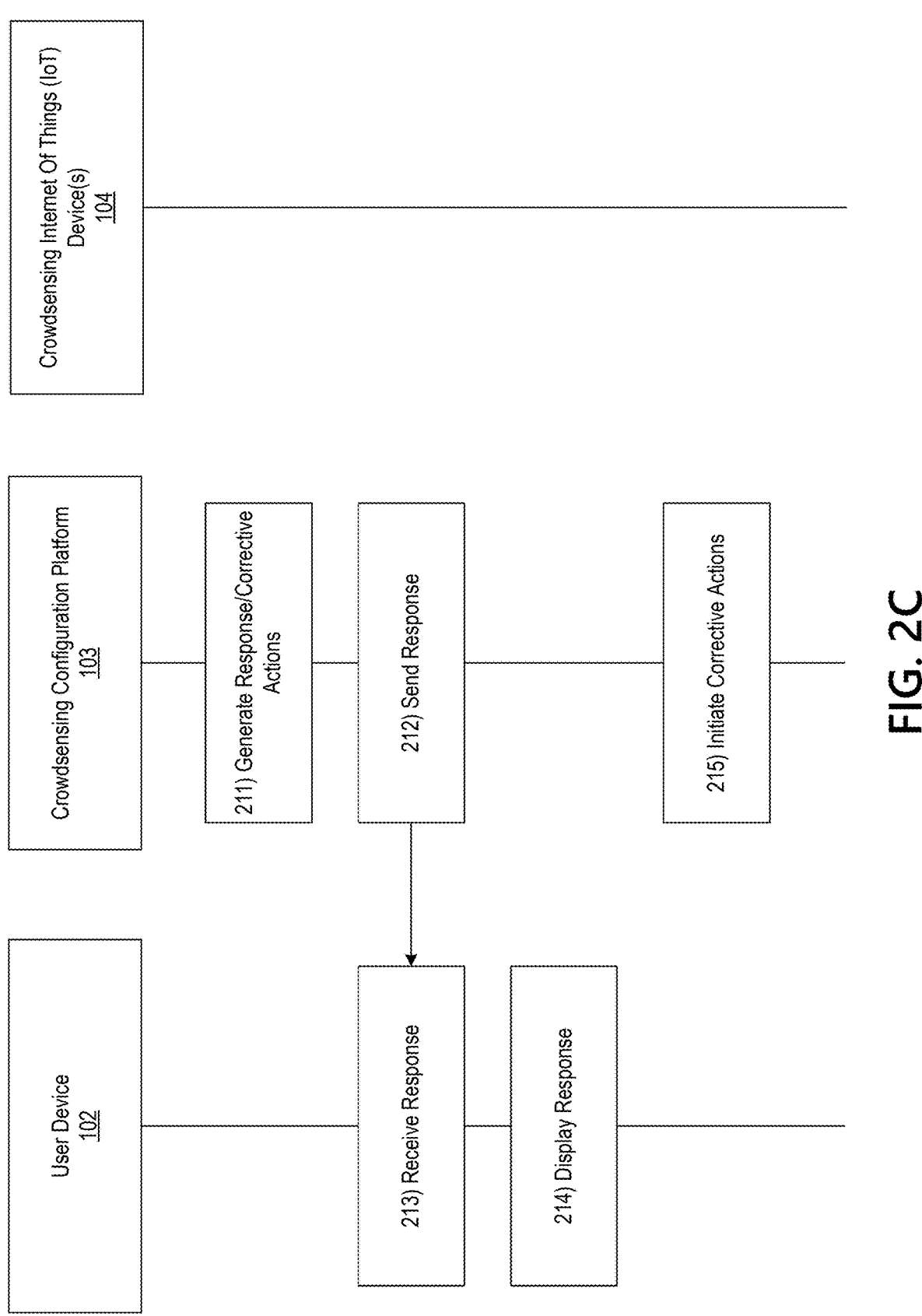

Referring to FIG. 2C, at step 211, the crowdsensing configuration platform 103 may generate a response to the prompt based on the IoT information. For example, the crowdsensing configuration platform 103 may feed the IoT information into a generative AI model configured to formulate a response to the prompt. For example, the generative AI model may correspond to a chatbot, application program interface (API), website, search engine, or the like configured to perform: generating human-like text, searching and retrieving information, summarizing text, performing classification, understanding natural language and answering questions, analyzing sentiment, filtering content, translating language, assisting with computer code, generating content for creative applications, and/or other functions based on the IoT information. In some instances, this generative AI model may have been previously trained on a representation of training data to generate new content that may be similar to or inspired by existing data, and that may include human-like outputs such as natural language text, source code, images/videos, audio samples, and/or other outputs.

In formulating the response, the crowdsensing configuration platform 103 may, for example, provide a response indicating a status of a machine (e.g., detecting tampering at an ATM, or the like), a detected anomaly (e.g., detecting fraud during use of a mobile banking application, or the like), and/or other requested information.

In addition or as an alternative to producing the response, the generative AI model may produce one or more corrective actions that may address any issues noted in the response. For example, the generative AI model may generate an action such as automatically dispatch a service member to a location of a corresponding system, automatically deploy a software update, send automated instructions to take a system offline, or the like.

At step 212, the crowdsensing configuration platform 103 may send the response to the user device 102. For example, the crowdsensing configuration platform 103 may send the response to the user device 102 while the first wireless data connection is established. In some instances, the crowdsensing configuration platform 103 may also send one or more commands directing the user device 102 to display the response.

At step 213, the user device 102 may receive the response sent at step 212. For example, the user device 102 may receive the response while the first wireless data connection is established. In some instances, the user device 102 may also receive the one or more commands directing the user device 102 to display the response.

At step 214, based on or in response to the one or more commands directing the user device 102 to display the response, the user device 102 may display the response. For example, the user device 102 may display the status of a machine (e.g., detecting tampering at an ATM, or the like), a detected anomaly (e.g., detecting fraud during use of a mobile banking application, or the like), and/or other requested information.

At step 215, the crowdsensing configuration platform 103 may initiate the corrective actions identified at step 214. For example, the crowdsensing configuration platform 103 may automatically dispatch a service member to a location of a corresponding system, automatically deploy a software update, send automated instructions to take a system offline, or the like.

Figure 2D:
Figure 2D:
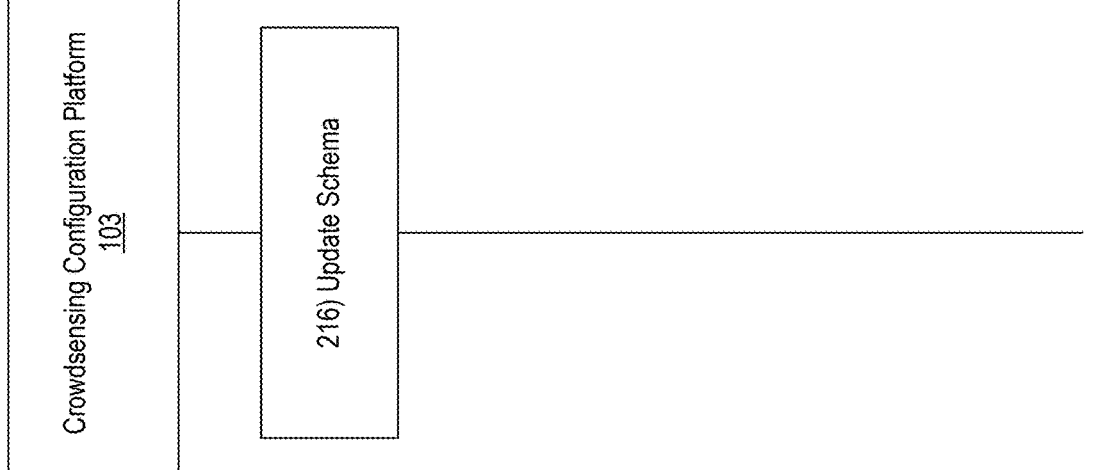
Figure 2D:

Referring to FIG. 2D, at step 216, the crowdsensing configuration platform 103 may update the schema. For example, the crowdsensing configuration platform 103 may detect a cause for an update, and may trigger the update accordingly. For example, the crowdsensing configuration platform 103 may detect that more than a predetermined number of crowdsensing IoT devices 104 no longer comply with rules defined in the smart contract corresponding to their respective clusters (e.g., in some instances, the crowdsensing IoT devices 104 may be monitored in real time), more than a predetermined amount of time has passed since the schema was selected, more than a predetermined amount of latency is experienced, and/or otherwise. In these instances, the crowdsensing configuration platform 103 may return to step 205 to generate an updated set of schema results. In some instances, in updating the schema, the crowdsensing configuration platform 103 may also adjust one or more of the corresponding smart contracts, and may update the schema based on the updated smart contracts.

Figure 3:
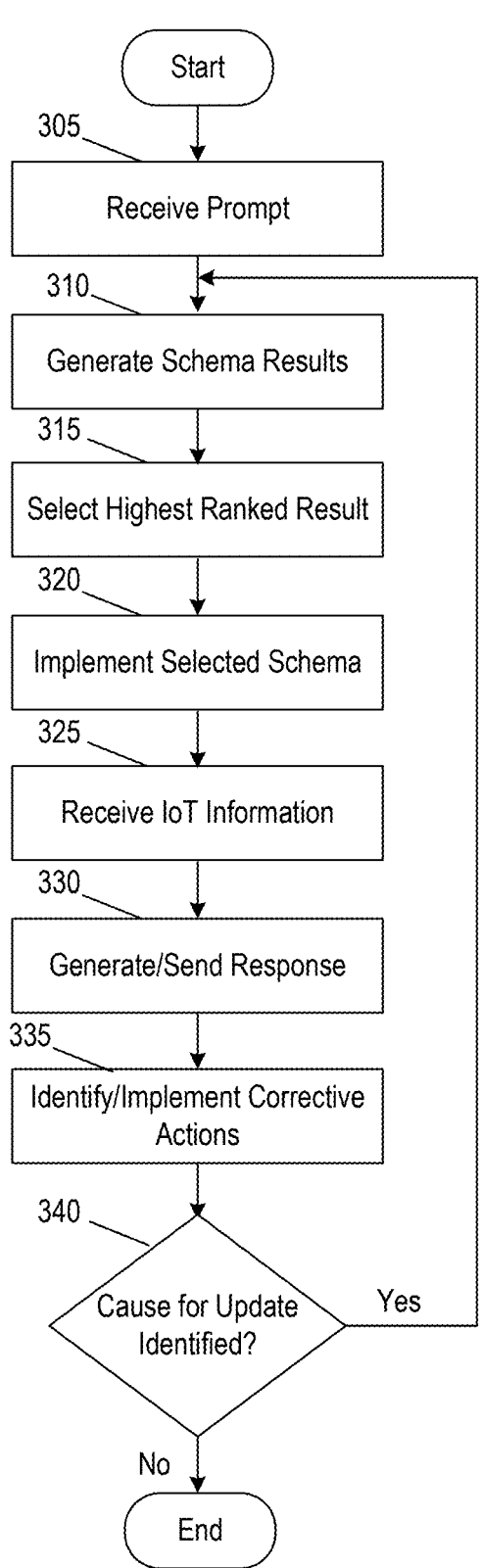
FIG. 3 depicts an illustrative method for leveraging photonic quantum generative AI to generate crowdsensing device configurations in accordance with one or more example embodiments.

FIG. 3 depicts an illustrative method for leveraging photonic quantum generative AI to generate crowdsensing device configurations in accordance with one or more example embodiments. Referring to FIG. 3, at step 305, a computing platform having at least one processor, a communication interface, and memory may receive a generative AI prompt. At step 310, the computing platform may use metadata of the generative AI prompt to generate schema results. At step 315, the computing platform may score the schema results, and select the results associated with the highest score. At step 320, the computing platform may implement the selected schema, prompting one or more IoT devices associated with the schema to provide crowdsensing information. At step 325, the computing platform may receive the IoT crowdsensing information. At step 330, the computing platform may generate, based on the IoT crowdsensing information, a response to the prompt, and may send the response accordingly. At step 335, the computing platform may identify, based on the crowdsensing information, corrective actions to perform and may implement them accordingly. At step 340, the computing platform may identify whether or not the schema should be updated. If so, the computing platform may return to step 310. Otherwise, the method may end.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:

at least one processor;

a communication interface communicatively coupled to the at least one processor; and memory storing computer-readable instructions that, when executed by the at least one processor, cause the computing platform to:

receive, from a user device, a prompt configured for input into a generative artificial intelligence (AI) model, wherein the prompt includes metadata comprising one or more of: a crowdsensing task description, business rules, security rules, data aggregation rules, data acquisition rules, crowdsensing task temporal and spatial rules, crowdsensing task software payload source information, IoT internet protocol (IP) addresses, or network type information;

generate, based the metadata, one or more smart contracts, each defining a device cluster within the configuration of device clusters;

identify, by inputting the prompt into the generative AI model, plurality of schemas, wherein each schema comprises a configuration of device clusters, wherein each device is an internet of things (IoT) enabled device configured to provide crowdsensed information, wherein the generative AI model identifies the plurality of schemas by scoring the plurality of schemas based on one or more of: latency in request processing, processing power, or computational complexity, and wherein scoring the plurality of schemas comprises assigning a score to each of the plurality of schemes on a scale of 0-100, with 0 being the worst and 100 being the best;

select, based on identifying that a first schema of the plurality of schemas has a highest score, the first schema;

collect, from a first plurality of devices comprising the first schema, crowdsensed information;

generate, based on the crowdsensed information, a response to the prompt and one or more corrective actions;

send, to the user device, the response to the prompt and one or more commands directing the user device to display the response to the prompt, wherein sending the one or more commands directing the user device to display the response to the prompt causes the user device to display the response to the prompt;

execute the one or more corrective actions, wherein executing the one or more corrective actions causes an issue, indicated in the response and detected based on the crowdsensed information, to be automatically remediated;

detect a schema update event, wherein detecting the schema update event comprises detecting one or more of:

more than a threshold number of the devices no longer satisfy the corresponding smart contract, more than a threshold amount of time has passed since the first schema was selected, or latency corresponding to the first schema exceeds a predetermined threshold;

update, based on detection of the schema update event, the one or more smart contracts; and update, using the updated one or more smart contracts, the first schema.

2. The computing platform of claim 1, wherein generating the first schema comprises identifying, using the one or more smart contracts, whether each IoT enable device may be added to a corresponding device cluster.

3. The computing platform of claim 1, wherein a first device cluster of the configuration of device clusters corresponds to a first device type and a second device cluster of the configuration of device clusters corresponds to a second device type.

4. The computing platform of claim 1, wherein collecting the crowdsensed information comprises collecting the crowdsensed information after receiving approval from the corresponding user.

5. The computing platform of claim 1, wherein the one or more corrective actions comprise one or more of: deploying a software update, dispatching a technician, or taking a system offline.

6. The computing platform of claim 1, wherein the memory stores additional computer-readable instructions that, when executed by the at least one processor, cause the computing platform to:

encrypt, using homomorphic encryption, the metadata of the prompt, wherein identifying the plurality of schemas is performed using the encrypted metadata.

7. The computing platform of claim 1, wherein the memory stores additional computer-readable instructions that, when executed by the at least one processor, cause the computing platform to:

identify, by monitoring the first schema in real time, one or more anomalies associated with at least one IoT device; and isolate, based on the one or more anomalies, one or more sections of the IoT device.

8. A method comprising:

at a computing platform comprising at least one processor, a communication interface, and memory:

receiving, from a user device, a prompt configured for input into a generative artificial intelligence (AI) model, wherein the prompt includes metadata comprising one or more of: a crowdsensing task description, business rules, security rules, data aggregation rules, data acquisition rules, crowdsensing task temporal and spatial rules, crowdsensing task software payload source information, IoT internet protocol (IP) addresses, or network type information;

generate, based the metadata, one or more smart contracts, each defining a device cluster within the configuration of device clusters;

identifying, by inputting the prompt into the generative AI model, a plurality of schemas, wherein each schema comprises a configuration of device clusters, wherein each device is an internet of things (IoT) enabled device configured to provide crowdsensed information, wherein the generative AI model identifies the plurality of schemas by scoring the plurality of schemas based on one or more of: latency in request processing, processing power, or computational complexity, and wherein scoring the plurality of schemas comprises assigning a score to each of the plurality of schemes on a scale of 0-100, with 0 being the worst and 100 being the best;

selecting, based on identifying that a first schema of the plurality of schemas has a highest score, the first schema;

collecting, from a first plurality of devices comprising the first schema, crowdsensed information;

generating, based on the crowdsensed information, a response to the prompt and one or more corrective actions;

sending, to the user device, the response to the prompt and one or more commands directing the user device to display the response to the prompt, wherein sending the one or more commands directing the user device to display the response to the prompt causes the user device to display the response to the prompt;

executing the one or more corrective actions, wherein executing the one or more corrective actions causes an issue, indicated in the response and detected based on the crowdsensed information, to be automatically remediated;

detecting a schema update event, wherein detecting the schema update event comprises detecting one or more of:

more than a threshold number of the devices no longer satisfy the corresponding smart contract, more than a threshold amount of time has passed since the first schema was selected, or latency corresponding to the first schema exceeds a predetermined threshold;

updating, based on detection of the schema update event, the one or more smart contracts; and updating, using the updated one or more smart contracts, the first schema.

9. The method of claim 8, wherein generating the first schema comprises identifying, using the one or more smart contracts, whether each IoT enable device may be added to a corresponding device cluster.

10. The method of claim 8, wherein a first device cluster of the configuration of device clusters corresponds to a first device type and a second device cluster of the configuration of device clusters corresponds to a second device type.

11. The method of claim 8, wherein collecting the crowdsensed information comprises automatically collecting the crowdsensed information without prompting a corresponding user for approval.

12. The method of claim 8, further comprising:

encrypting, using homomorphic encryption, the metadata of the prompt, wherein identifying the plurality of schemas is performed using the encrypted metadata.

13. Method of claim 8, further comprising:

identifying, by monitoring the first schema in real time, one or more anomalies associated with at least one IoT device; and isolating, based on the one or more anomalies, one or more sections of the IoT device.

14. One or more non-transitory computer-readable media storing instructions that, when executed by a computing platform comprising at least one processor, a communication interface, and memory, cause the computing platform to:

receive, from a user device, a prompt configured for input into a generative artificial intelligence (AI) model, wherein the prompt includes metadata comprising one or more of: a crowdsensing task description, business rules, security rules, data aggregation rules, data acquisition rules, crowdsensing task temporal and spatial rules, crowdsensing task software payload source information, IoT internet protocol (IP) addresses, or network type information;

generate, based the metadata, one or more smart contracts, each defining a device cluster within the configuration of device clusters;

identify, by inputting the prompt into the generative AI model, a plurality of schemas, wherein each schema comprises a configuration of device clusters, wherein each device is an internet of things (IoT) enabled device configured to provide crowdsensed information, wherein the generative AI model identifies the plurality of schemas by scoring the plurality of schemas based on one or more of: latency in request processing, processing power, or computational complexity, and wherein scoring the plurality of schemas comprises assigning a score to each of the plurality of schemes on a scale of 0-100, with 0 being the worst and 100 being the best;

select, based on identifying that a first schema of the plurality of schemas has a highest score, the first schema;

collect, from a first plurality of devices comprising the first schema, crowdsensed information;

generate, based on the crowdsensed information, a response to the prompt and one or more corrective actions;

send, to the user device, the response to the prompt and one or more commands directing the user device to display the response to the prompt, wherein sending the one or more commands directing the user device to display the response to the prompt causes the user device to display the response to the prompt;

execute the one or more corrective actions, wherein executing the one or more corrective actions causes an issue, indicated in the response and detected based on the crowdsensed information, to be automatically remediated;

detect a schema update event, wherein detecting the schema update event comprises detecting one or more of:

more than a threshold number of the devices no longer satisfy the corresponding smart contract, more than a threshold amount of time has passed since the first schema was selected, or latency corresponding to the first schema exceeds a predetermined threshold;

update, based on detection of the schema update event, the one or more smart contracts; and update, using the updated one or more smart contracts, the first schema.

15. The one or more non-transitory computer-readable media of claim 14, wherein generating the first schema comprises identifying, using the one or more smart contracts, whether each IoT enable device may be added to a corresponding device cluster.

16. The one or more non-transitory computer-readable media of claim 14, wherein a first device cluster of the configuration of device clusters corresponds to a first device type and a second device cluster of the configuration of device clusters corresponds to a second device type.

17. The one or more non-transitory computer-readable media of claim 14, wherein collecting the crowdsensed information comprises collecting the crowdsensed information after receiving approval from the corresponding user.

18. The one or more non-transitory computer-readable media of claim 14, wherein the one or more corrective actions comprise one or more of: deploying a software update, dispatching a technician, or taking a system offline.

19. The one or more non-transitory computer-readable media of claim 14, wherein the memory stores additional computer-readable instructions that, when executed by the at least one processor, cause the computing platform to:

encrypt, using homomorphic encryption, the metadata of the prompt, wherein identifying the plurality of schemas is performed using the encrypted metadata.

20. The one or more non-transitory computer-readable media of claim 14, wherein the memory stores additional computer-readable instructions that, when executed by the at least one processor, cause the computing platform to:

identify, by monitoring the first schema in real time, one or more anomalies associated with at least one IoT device; and isolate, based on the one or more anomalies, one or more sections of the IoT device.

\* \* \* \* \*